(12) United States Patent
Enns et al.

(10) Patent No.: US 10,216,156 B2
(45) Date of Patent: Feb. 26, 2019

(54) CONTROLLING CUTTING HEIGHT AND ANGLE OF A COMBINE HEADER

(71) Applicant: MacDon Industries Ltd., Winnipeg (CA)

(72) Inventors: John Edward Enns, Winnipeg (CA); Andrew William Dean Bell, Winnipeg (CA)

(73) Assignee: MacDon Industries Ltd., Winnipeg, MB (CA)

(*) Notice: Subject to any disclaimer, the term of this patent is extended or adjusted under 35 U.S.C. 154(b) by 441 days.

(21) Appl. No.: 14/645,000

(22) Filed: Mar. 11, 2015

(65) Prior Publication Data

US 2015/0271999 A1  Oct. 1, 2015

Related U.S. Application Data

(60) Provisional application No. 61/969,938, filed on Mar. 25, 2014.

(51) Int. Cl.
| | | |
|---|---|---|
| *A01B 63/111* | (2006.01) | |
| *A01B 69/00* | (2006.01) | |
| *A01D 41/127* | (2006.01) | |
| *G05B 15/02* | (2006.01) | |
| *A01D 41/14* | (2006.01) | |

(52) U.S. Cl.
CPC ........... *G05B 15/02* (2013.01); *A01D 41/141* (2013.01); *A01D 41/145* (2013.01)

(58) Field of Classification Search
CPC .... A01D 41/141; A01D 34/008; A01D 43/04; A01D 57/20; A01D 41/145; A01D 34/006; A01D 41/127; G05B 15/02; A01B 63/111; A01B 69/00
See application file for complete search history.

(56) References Cited

U.S. PATENT DOCUMENTS

| | | | |
|---|---|---|---|
| 3,597,907 A | 8/1971 | Neal et al. | |
| 7,874,132 B2 | 1/2011 | Sauerwein | |
| 7,992,369 B2 | 8/2011 | Coers et al. | |
| 2004/0014509 A1* | 1/2004 | Brome | A01D 41/1274 460/1 |
| 2006/0213168 A1* | 9/2006 | Remillard | A01D 57/02 56/10.2 R |

(Continued)

FOREIGN PATENT DOCUMENTS

| | | |
|---|---|---|
| CA | 2377846 | 12/2002 |
| CA | 2823199 | 2/2014 |
| EP | 2156725 | 2/2010 |

*Primary Examiner* — Adam D Tissot
*Assistant Examiner* — Aaron C Smith
(74) *Attorney, Agent, or Firm* — Ade & Company Inc.; Adrian D. Battison; Ryan W. Dupuis

(57) ABSTRACT

A header assembly for a combine harvester includes a header carried by an adapter on the feeder house of the combine controlling an angle of the header defined by a tilt cylinder and height of the header at the feeder house. Wings of the header are carried on gauge wheels the height of which relative to the header frame can be adjusted by cylinders. A driver interface inside the cab includes inputs to be set by the driver of cutter bar height and header angle. These are converted by the controller program into inputs for the tilt cylinder and the gauge wheel cylinders.

19 Claims, 5 Drawing Sheets

(56) References Cited

U.S. PATENT DOCUMENTS

| | | | |
|---|---|---|---|
| 2010/0043368 A1* | 2/2010 | Sloan | A01D 41/145 56/10.2 E |
| 2010/0281837 A1* | 11/2010 | Talbot | A01D 41/141 56/10.2 E |
| 2015/0033692 A1* | 2/2015 | Schroeder | A01D 41/141 56/10.2 E |

* cited by examiner

CONTROLLING CUTTING HEIGHT AND ANGLE OF A COMBINE HEADER

This application claims the benefit under 35 USC 119 e) of Provisional Application 61/969,938 filed Mar. 25, 2014.

This invention relates to a header for a combine harvester where the header includes ground engaging gauge wheels and particularly which includes a control system operable by the driver for controlling cutting height and header angle.

BACKGROUND OF THE INVENTION

Headers for combine harvesters are mounted on the feeder house of the combine for cutting a standing crop and feeding the crop to the feeder house for transportation into the combine for processing. Such headers typically include a sickle knife cutter bar for cutting the standing crop, a converging system for transporting the crop inwardly along the header to the feeder house and a reel for sweeping the crop over the cutter bar onto the converging system.

In some cases the headers include gauge wheels at the outer ends for partly supporting the header and a mounting arrangement for the header on the feeder house which supports the header at a required height. In some cases the mounting arrangement includes an adapter which provides a floating action of the header relative to the feeder house. In other cases the height of the header at the feeder house is controlled by lift cylinders which locate the header at the required height as determined by the height of the gauge wheels.

The gauge wheels can be adjusted so that the cutter bar can rest on the ground and float over the ground in a cutting action or can be located at a pre-set cutting height relative to the ground. The driver must therefore be able to control the cutting height of the sickle knife from the ground and typically this can be adjusted on an on the go basis A further important factor to be controlled by the driver of the combine is the angle of the header to the ground during the cutting action. The header angle is an angle around a transverse axis so that the header is laid rearwardly at a low angle in some cutting conditions where the crop is standing upwardly for harvesting and is tilted forwardly to a much more aggressive angle for some other conditions. The forward angle acts to move the reel forwardly and to present it more aggressively over the crop. It is well known that the angle of tilt of the header should be adjusted on an on-the-go basis so that the driver can accommodate different conditions of crop for example where the crop is lodged and must be lifted more vigorously

SUMMARY OF THE INVENTION

It is one object of the invention to provide a header for a combine harvester where the header includes ground engaging gauge wheels and particularly which includes a control system operable by the driver for controlling cutting height and header angle.

According to invention the is provided a header assembly for attachment to a feeder house of a combine harvester for movement in a forward working direction across a field carrying a standing crop to be harvested, the header assembly comprising:

a header comprising:

a header frame;

a sickle cutter bar carried across a front of the header frame for cutting standing crop;

a reel for carrying the crop over the cutter bar;

a crop transport device for transporting the crop inwardly from ends of the header to a collection location for feeding to the combine harvester;

a mounting arrangement for mounting the header frame on the feeder house of the combine harvester;

first and second ground engaging gauge wheels on the header frame one on each side of the feeder house;

the ground engaging gauge wheels being mounted on the header frame at a position spaced rearwardly of the cutter bar;

first and second adjustable links for adjusting the height of the first and second gauge wheels respectively relative to the header frame in response to a height input;

an angle adjustment member for tilting the header frame forwardly and rearwardly about an axis transverse to the forward working direction relative to said mounting arrangement in response to an angle input;

a control system operable by a driver including a driver interface arranged for input by the driver of:

a first input acting to set a value of a required height of the cutter bar from the ground;

and a second input acting to set a value of required angle of the header relative to the ground;

the control system including a program responsive to the first and second inputs for generating said height input to said first and second adjustable links and said angle input to said angle adjustment member to automatically obtain said set a value of a required height of the cutter bar from the ground and said set a value of required angle of the header relative to the ground.

Preferably there is provided a height adjustment arrangement for adjusting the height of header relative to the combine harvester and the height of the header relative to the combine harvester is adjusted in association with the height of the first and second wheels. This can be controlled automatically by the combine harvester where the height of the header relative to the combine harvester automatically retains the header height so as to maintain part of the header at the feeder house at a required height to match the height at the gauge wheels.

The header can be a rigid header having no ability to flex or it can be a header of the three part type with a center section and two wing sections where each of the wing sections is each flexibly coupled to the center section. Yet further it can be used with a header of the type where the cutter bar flexes relative to the header frame to accommodate changes in ground contour.

Preferably the height of the header relative to the combine harvester is controlled by raising and lowering the feeder house.

Preferably there is provided an adapter arranged to be mounted on the feeder house which supports the header on the feeder house including a crop transfer arrangement for carrying the crop material through the adapter to the feeder house. However the header may also be directly mounted on the feeder house without use of a separate adapter.

Preferably there is provided a floating suspension system for carrying the header on the feeder house. This can be attached directly between the header and the feeder house or on the adapter. Alternatively the position of the header on the feeder house can be non-floating, that is it can be fixed or it can be movable by actuators such as hydraulic cylinders which do not provide any floating action.

When a floating support is used, preferably the floating suspension system is arranged such that a major part of the weight of the header, such as up to 90%, is carried on the feeder house and a smaller part is carried on the gauge wheels. Such a floating suspension system can be adjustable so as to set a required proportion of the weight of the header which is carried on the feeder house relative to a proportion of the weight of the header which is carried on the gauge wheels.

In one preferred example, there is provided a float sensor for sensing a float distance of the header relative to a point fixed relative to the feeder house and for generating a signal indicative thereof and an automatic header height control system arranged to raise and lower the feeder house in response to the signal from the float sensor so as to attempt to maintain the float distance at a required set value. This acts to maintain the header part at the feeder house at the required height while maintaining the floating lift force constant.

Typically the header frame includes a top main beam and a plurality of legs depending from the top main beam for carrying the crop transport system and the cutter bar and the gauge wheels are mounted so that they extend to a position behind the legs.

Preferably the gauge wheels are mounted on the header frame such that, when adjusted to the required position, the gauge wheels are fixed relative to the header frame substantially without any suspension floating movement relative thereto. However they may also be free to float if required. That is the gauge wheels can be either fixed or suspended. In the embodiment described hereinafter there is no suspension floating movement. This is not necessary. The gauge wheels typically will have a suspension system which can be provided by a hydraulic accumulator in the hydraulic system or could be mechanical springs. Thus the gauge wheels will operate substantially without any suspension.

Preferably the first and second adjustable links each comprise a hydraulic cylinder which can directly act on a lever carrying the wheel extending rearwardly from the frame. However other linkages and actuators such as electrical actuators can be used.

Preferably the driver interface comprises a touch screen or other screen and control button interface mounted in a cab of the combine harvester. This can be either a separate control system independent of a control system for the combine harvester or it can be integrated with a control system for the combine harvester. The system may use a touch screen but cost often requires a cheaper screen that uses buttons on the sides and a rotary input etc. The basic idea is that there is provided an arrangement to give the operator information or feedback (the screen) and a means for him to control inputs, which could be a touch screen or a "plurality" of knobs and buttons etc.

Preferably the driver interface includes a third input acting to set a value of a required speed of the crop transport device particularly where the crop transport device includes a draper.

The invention also provides a combine harvester comprising a harvesting machine for processing cut crop material, a feeder house of the harvesting machine for feeding the cut crop into an inlet of the harvesting machine; and a header assembly of the type as defined by any of the paragraphs above.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

Figure 1:
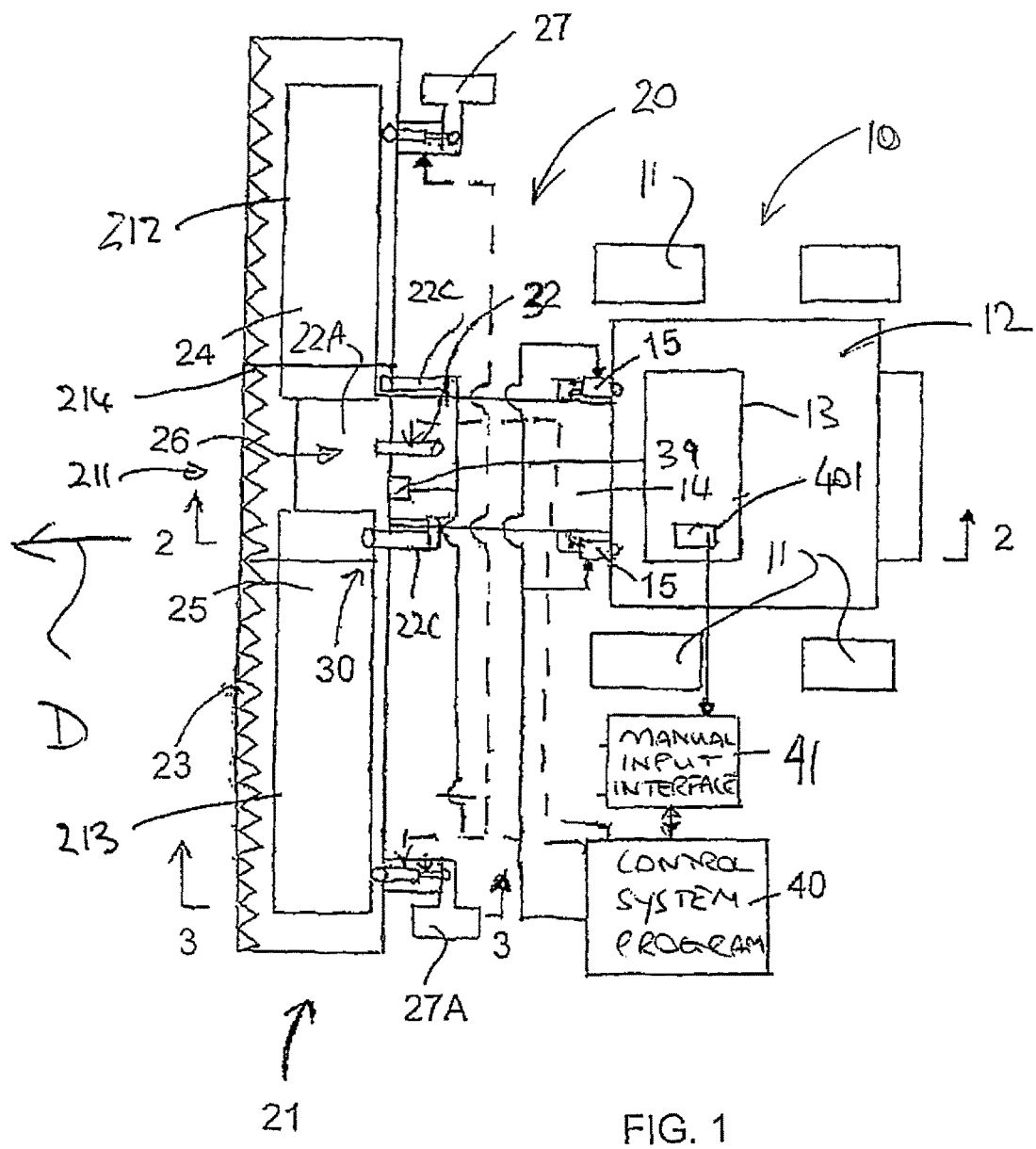
FIG. 1 is a schematic plan view of a combine harvester including a header assembly according to the present invention.

A combine harvester is shown schematically at 10 and includes ground wheels 11, a main housing 12 containing the crop processing devices, a cab 13 for the operator and a feeder house 14 for receiving the crop material and feeding it into the housing for processing. The details of combine harvesters are well known to a person skilled in this art so that no detail is necessary for an understanding of this invention.

The feeder house 14 is mounted on the housing in a manner which allows it to be raised and lowered as indicated at 14A to lift the header carried on the front of the combine. For example the feeder house includes cylinders 15 which raise and lower the front end 16 of the feeder house.

A header assembly 20 is attached to the feeder house 14 of the combine harvester 10 and includes a header 21 and an adapter 22 which attaches the header to the feeder house. The adapter 22 is provided to control the feeding of crop by a conveyor 22A into the feeder house 14 and to provide a lifting force by springs 22B and lift arms 22C of a suspension system 30 to the header to carry it forwardly on the front of the feeder house.

The header is generally of a conventional construction well known to a person skilled in this art and the major components include a cutter bar 23 for cutting standing crop and a crop transport device defined by a pair of drapers 24 and 25 for transporting the standing crop inwardly from ends of the header to a collection location 26 at the conveyor 22A for feeding to the combine harvester.

The header includes two ground engaging gauge wheels 27 and 27A on the header one on each side of the adapter 22. The number of wheels can be increased in some cases so that double wheels are used or wheels on an axle but in generally the wheels act so support the header on each side of the support from the adapter 22.

Figure 3:
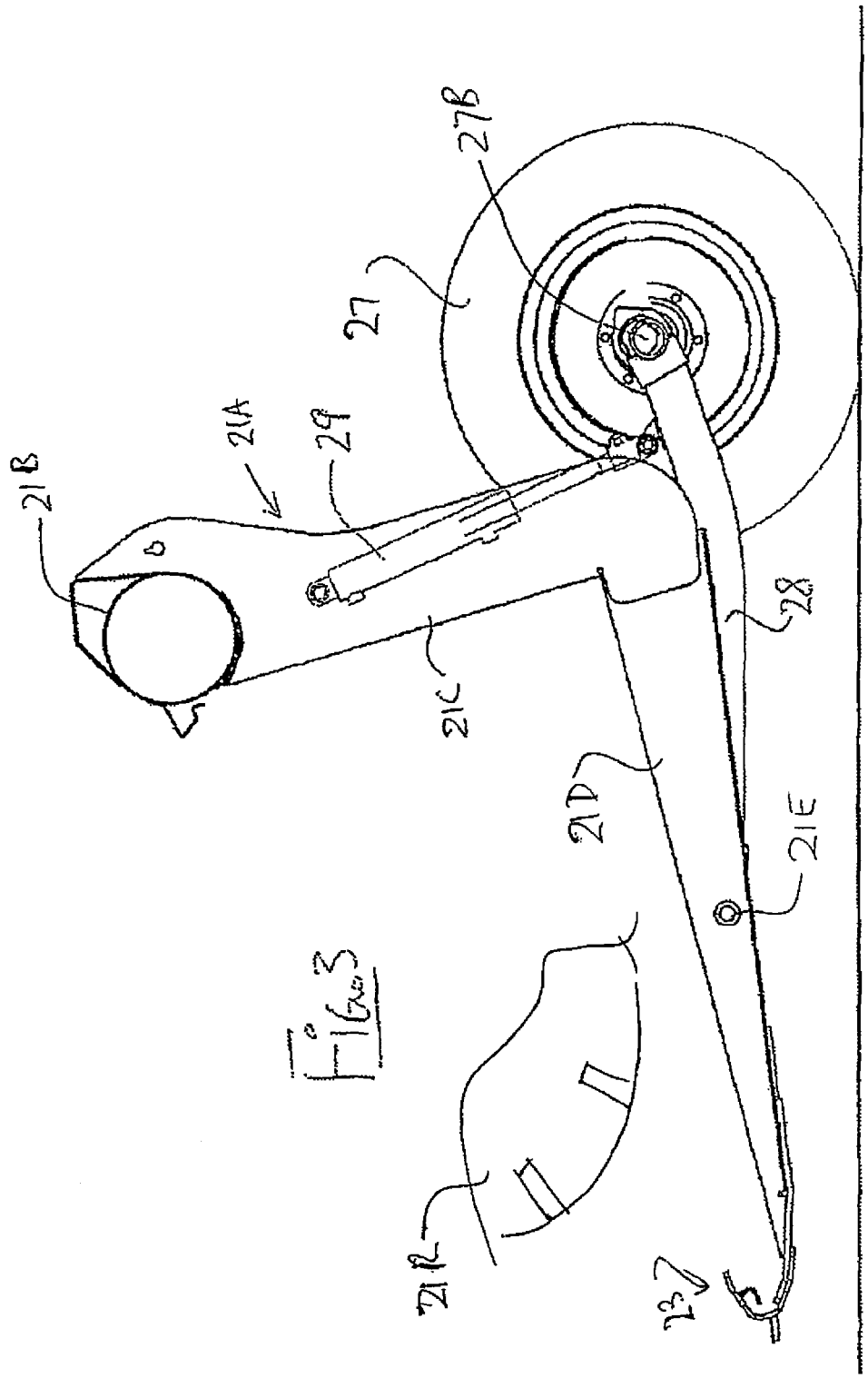
FIG. 3 is a schematic cross sectional view along the lines 3-3 of FIG. 1.

Each gauge wheel 27, 27A is mounted on the header for up and down adjustment movement of a position of the gauge wheel relative to the header to control the height of the frame 21A (FIG. 3) of the header from the ground. The header frame 21A includes a main transverse beam 21B and a plurality of depending legs 21C which connect to forwardly extending arms 21D carrying the conveyors 24, 25 and the cutter bar 23. Thus in the example shown the wheel 27 is mounted on a pivot arm 28 pivotally mounted on the header frame at a pivot point 21E on the arm 21D so that the arm projects rearwardly from the rear of the frame with the wheel 27 at the rear end so that the wheel is carried on an axle 27B rearwardly of the leg 21C. The arm 28 is attached to the frame by an adjustable link which is typically a cylinder 29 operable by a control described hereinafter arranged to be located in the cab 13 of the combine harvester to adjust the position of the gauge wheel relative to the header to a required position so as to adjust the height of cut of frame 21A from the ground.

The gauge wheels 27 and 27A are fixed to the cylinders 29 which are fixed to the frame 21A so that the wheels are mounted on the header such that, when adjusted to the required position, the gauge wheels are fixed relative to the header frame substantially without any suspension floating movement relative thereto. Thus there are preferably no springs or suspension movements allowed and the wheel is rigid to the frame.

Figure 2:
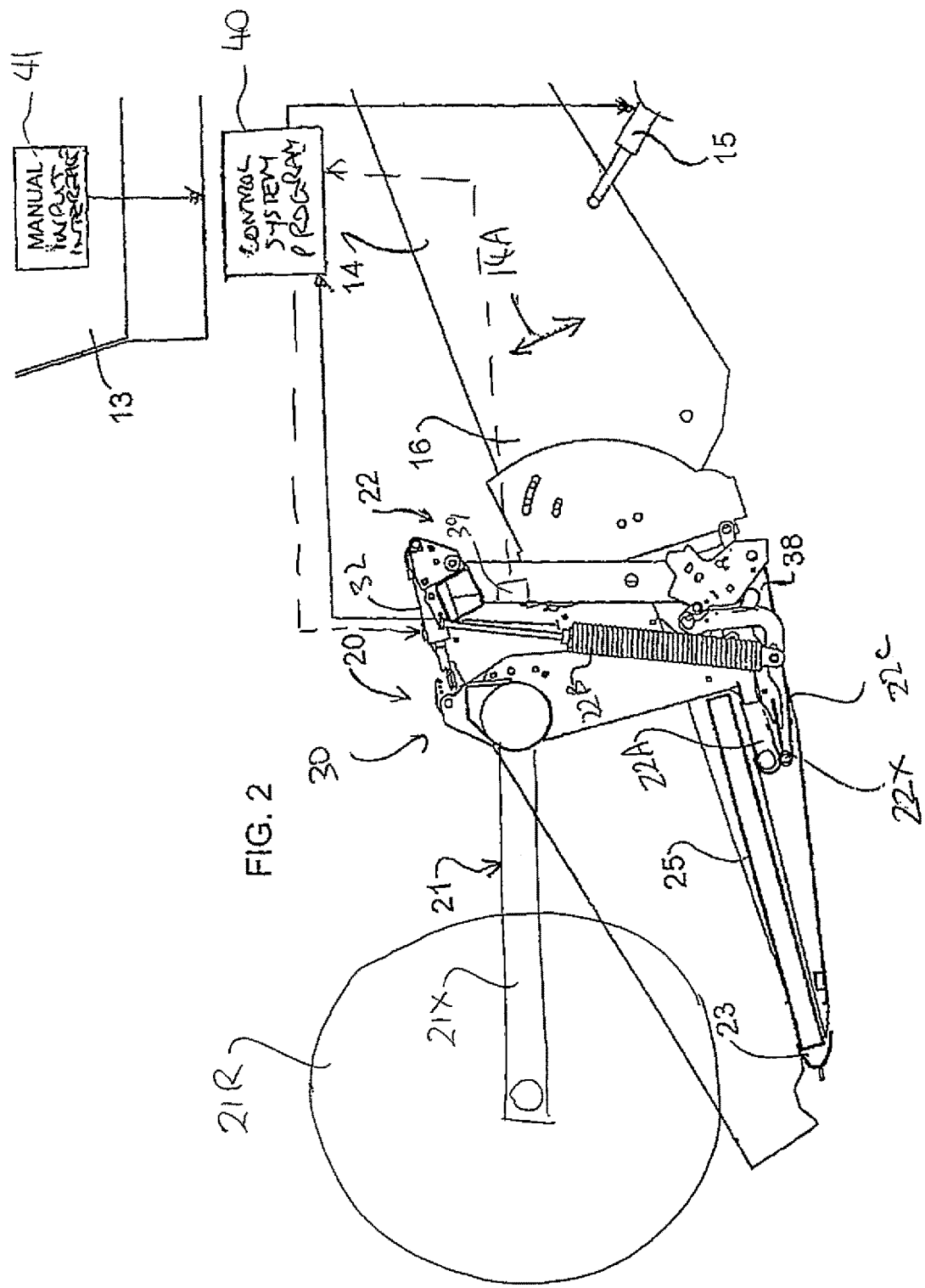
FIG. 2 is a schematic cross sectional view along the lines 2-2 of FIG. 1.

The connection between the adapter and the header shown in FIG. 2 includes a suspension system 30 with a center top link 32 and the two side suspension arms 22C for carrying the header on the adapter. As is well known, the suspension arrangement allows side to side pivotal movement of the header relative to the adapter as well as vertical floating movement of the header. Thus the suspension arms 22C are connected to springs 22B which have a spring force which can be adjusted to vary the lifting force applied to the header from the adapter.

Thus the suspension system is adjustable so as to set a required proportion of the weight of the header which is carried on the feeder house 14 relative to a proportion of the weight of the header which is carried on the gauge wheels 76.

The springs 22B of the suspension system are arranged such that a major part of the weight of the header is carried on the feeder house 14 and a smaller part is carried on the gauge wheels 27 and typically the proportion of the weight which is carried on the feeder house is of the order of 90%.

The suspension may be arranged such that upward movement of the feeder house acts to increase a lifting force to the header and downward movement of the feeder house acts to decrease the lifting force to the header and/or such that upward movement of the feeder house acts to reduce the separation between the header and the adapter and downward movement of the feeder house acts to increase the separation between the header and the adapter, although these may not occur depending on the mechanical arrangement or may not occur in all parts of the range of movement.

A bottom stop 38 is provided which is arranged to limit downward movement of the header relative to the adapter 22 and a float sensor 39 is provided for sensing a float distance of the header relative to the bottom stop and for generating a signal indicative thereof.

A programmed control system 40 is provided which includes an automatic header height control system 40 arranged to raise and lower the feeder house 14 in response to the signal from the float sensor 39 so as to attempt to maintain the float distance at a required set value. The set value is selected so that the header is free to float between the bottom stop 38 and an upper limit of movement both upwardly and downwardly to an extent to accommodate changes in ground height. Thus the distance of the header from the ground is controlled by the gauge wheels and the weight of the header is primarily carried on the suspension of the feeder house. In the event that the set float distance from the bottom stop 38 decreases because the header has moved downwardly relative to the feeder house 14, the lift cylinders 15 are operated by the control system 40 using the input from the automatic height control 39 to lower the feeder house. In the event that the set float distance from the bottom stop increases as detected by the sensor 39 because the header has moved upwardly relative to the feeder house 14, the lift cylinders 15 are operated by the control 40 to raise the feeder house.

In operation, the header is dropped on the ground until the gauge wheels contact the ground, and causes the header to "float" with respect to the adapter frame. The programmed control 40 is set so that the combine feeder house 14 stops lowering when the pre-set amount of header to adapter separation (float) is achieved as detected by the sensor 39. This allows the header to move up and down smoothly to follow the ground contour. To change the cutting height, the cylinders attached to the gauge wheels are operated. The programmed control 40 then causes the main lift cylinders 15 to react so that the pre-set float is maintained.

The header assembly 20 is thus mounted on the feeder house 14 of the combine harvester 12 for movement in a forward working direction D across a field carrying a standing crop to be harvested.

The header assembly 20 includes the header 21 with the header frame 21A carrying the sickle cutter bar 23 across a front of the header frame for cutting standing crop and a reel 21R on pivotal support arms 21X for carrying the crop over the cutter bar. The drapers 24, 25 form a crop transport device for transporting the crop inwardly from ends of the header to the collection location 26 for feeding to the combine harvester.

The adapter 22 forms a mounting arrangement for mounting the header frame on the feeder house 14 of the combine harvester. The first and second ground engaging gauge wheels 27, 27A on the header frame one on each side of the feeder house are mounted on the header frame 21A at a position spaced rearwardly of the cutter bar 23.

The cylinders 29 provide first and second adjustable links for adjusting the height of the first and second gauge wheels 27, 27A respectively relative to the header frame in response to a height input from the control system 40.

The cylinder 32 acts in response to an angle input from the control system 40 as an angle adjustment member for tilting the header frame 21A forwardly and rearwardly about the axis 22X at the forward end of the support arms 22C of the suspension 22 where the axis 22X is transverse to the forward working direction D relative to the mounting arrangement.

As shown in FIG. 1, the header 21 comprises a three part header with a center section 211 and two wing sections 212, 213 where each of the wing sections is each flexibly coupled to the center section at a coupling 214. This arrangement is well known and shown in many patents of the Applicants herein.

The control system 40 is operable by an operator/driver of the combine through a driver interface 41 in the cab which is arranged for input by the driver of a first input 45 by a control button 45A acting to set a value of a required height of the cutter bar from the ground and a second input 46 by a control button 46A acting to set a value of required angle of the header relative to the ground. The driver interface is shown in more detail in FIG. 4 and includes a screen 41 which can be a touch screen, and a plurality of selection buttons 42 and a dial 43.

An icon 44 of the screen 41 shows to the driver the input parameters above of the required height of the cutter bar from the ground as indicated at 45 and the angle of the header as indicated at 46. The driver can select a value to be inserted at a predetermined time or can insert a series of pre-set values to be selected when required.

It will be appreciated that the height of the cutter bar and the angle of the header are not directly proportional to the adjustment of the ground wheels 27, 27A by the cylinders 29 and the adjustment of the cylinder 32. That is the adjustment of the cylinder 32 to adjust the header angle also adjusts the ground height of the cutter bar and also the adjustment of the cylinders 29 to adjust the cutter bar height also changes the header angle. Thus the control system 40 which connects to the driver interface 41 includes a program responsive to the first and second inputs 45, 46 for generating height input to the first and second adjustable links 29 and the angle input to the angle adjustment cylinder 32 to automatically obtain the set value 45 of a required height of the cutter bar from the ground and the set a value 46 of required angle of the header relative to the ground.

This acquisition of the height input and angle input required can be obtained from a look-up table 48 which contains all of the calculated data corresponding to set values of header angles and header height. As an alternative the calculations can carried out in real time with a predetermined algorithm or formula. The look up table 48 provides the required sensor position of the actuators 32 and 29 for a the matrix of given desired heights and table angles.

The arrangement for controlling the height of the header relative to the combine harvester by adjusting the position of the feeder house 14 is also arranged so that it automatically retains the required header height using the input signal from the sensor 39 so as to maintain the center part of the header at the feeder house 14 at the required height to match the height at the gauge wheels. This can be done by providing a direct signal from the sensor 39 to the feeder house control cylinders or by the float height control system described above operated by the control 40.

The combine harvester includes a driver operable control system 401 (FIG. 1) and the driver interface 41 of the control system 40 is a separate control system in the cab but independent of the control system 401 for the combine harvester.

Figure 4:
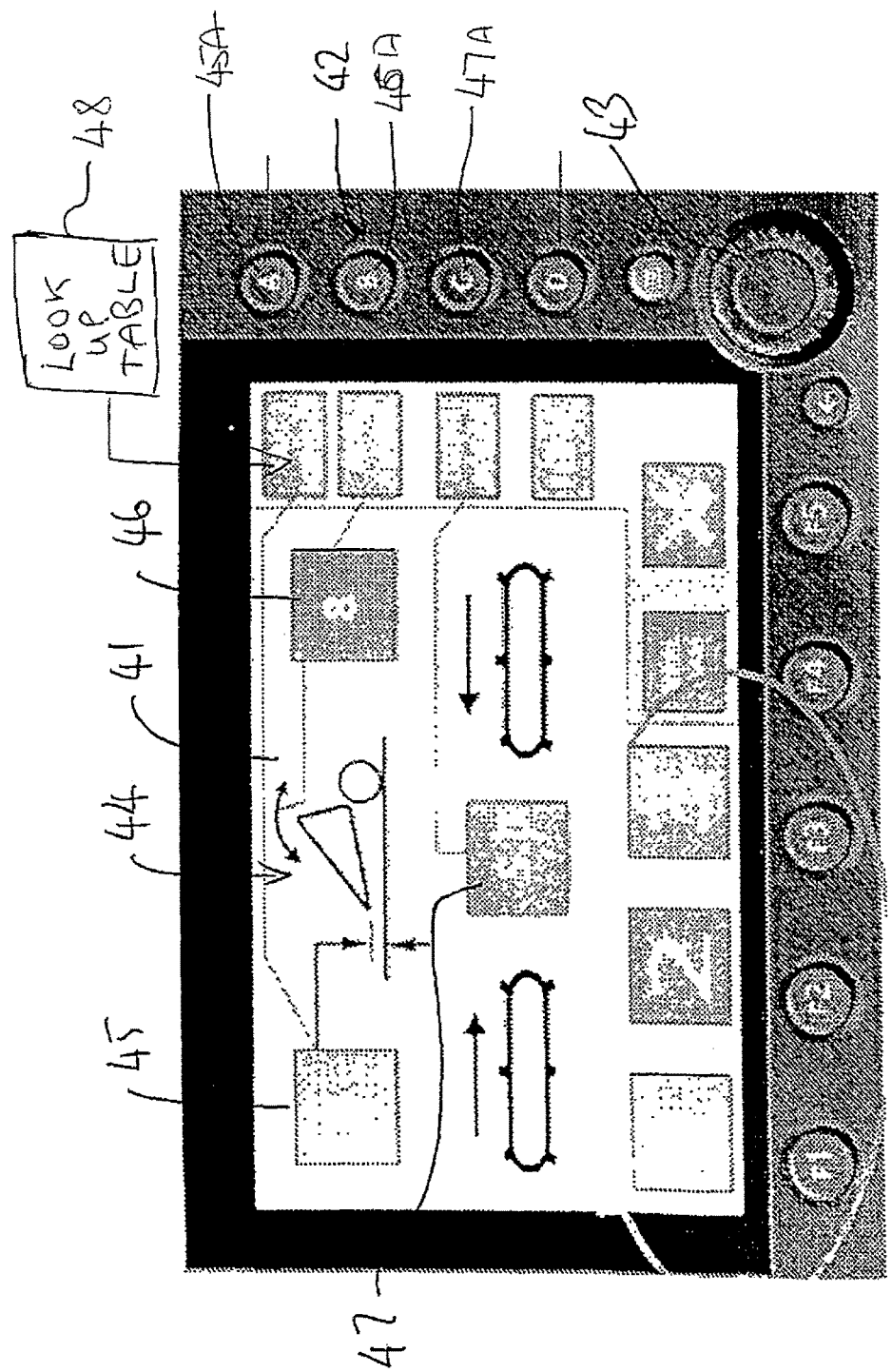
FIGS. 4, 5 and 6 show a display screen and control input including various screen captures.

As shown in FIG. 4, the driver interface 41 further includes a third input 47 entered using a button 47A acting to set a value of a required speed of the crop transport device or drapers 24, 25. This is merely one example of operating parameters which may be controlled on the same interface 41.

Thus in operation the driver selects one of buttons 45A, 46A and 47A depending on the parameter to be changed and uses the dial or scroll wheel to enter the required value.

Figure 5:
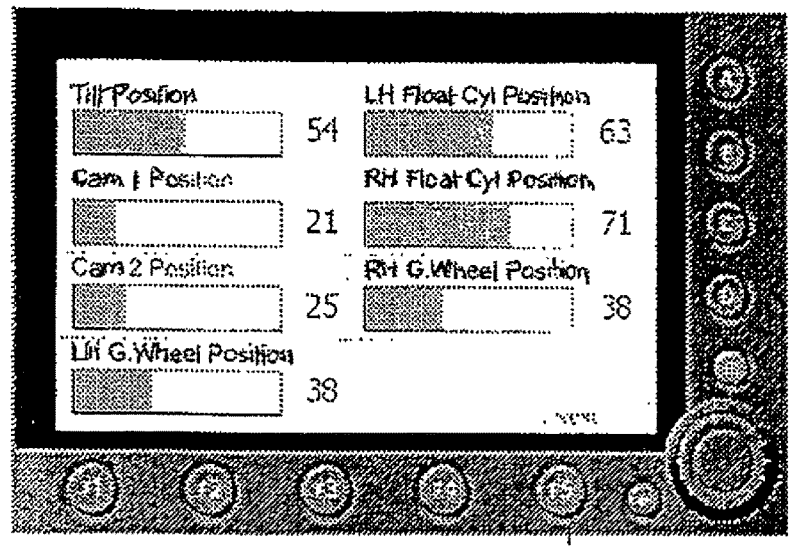

FIG. 5 shows a screen of the interface showing feedback sensors on the actuators described above including actuators 29 and 32 and float cylinders 22C so that the driver can monitor the actual positions assumed by those components.

Figure 6:
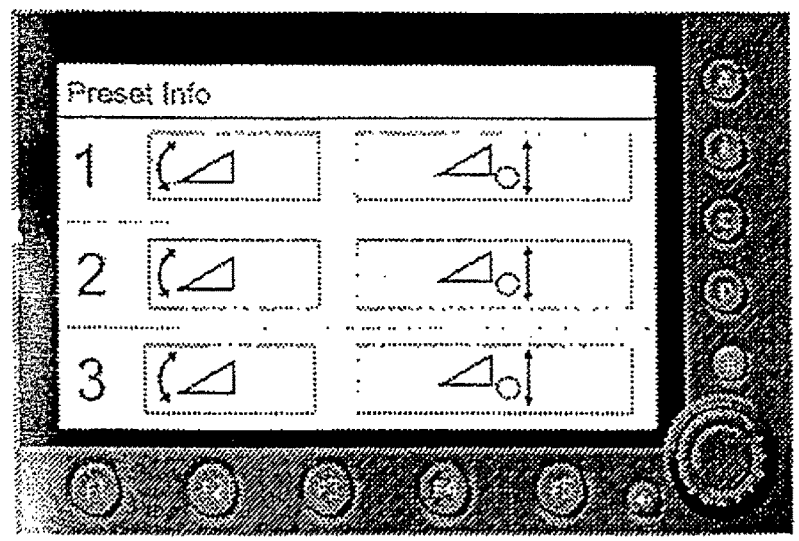

FIG. 6 shows a screen of the interface showing three separate pre-sets of the cutting height and header angle as described above.

The invention claimed is:

1. A header assembly for attachment to a feeder house of a combine harvester for movement in a forward working direction across a field carrying a standing crop to be harvested, the header assembly comprising:
   a header comprising:
      a header frame;
      a sickle cutter bar carried across a front of the header frame for cutting standing crop;
      a reel for carrying the crop over the cutter bar;
      a crop transport device for transporting the crop inwardly from either end of the header to a collection location for feeding to the combine harvester;
   a mounting arrangement for mounting the header frame on the feeder house of the combine harvester;
   first and second ground engaging gauge wheels on the header frame one on each side of the feeder house;
   the ground engaging gauge wheels being mounted on the header frame at a position spaced rearwardly of the cutter bar;
   first and second adjustable links for adjusting the height of the first and second gauge wheels respectively relative to the header frame in response to a height input to adjust a cutter bar height;
   an angle adjustment member for tilting the header frame forwardly and rearwardly about an axis transverse to the forward working direction relative to said mounting arrangement in response to an angle input to adjust an angle the header;
   wherein the adjustment of the adjustment member to adjust the angle of the header also changes the height of the cutter bar and also the adjustment of the first and second adjustable links to adjust the height of the cutter bar also changes the angle of the header;
   a control system operable by a driver including a driver interface arranged for input by the driver of:
      a first manually operable input operable by the driver acting to set a value of required height of the cutter bar from the ground;
      and a second manually operable input operable by the driver acting to set a value of required angle of the header relative to the ground about said axis;
   the control system including a program which is responsive to the first manually operable input for generating both said height input to said first and second adjustable links and said angle input to said angle adjustment member to automatically attain said set value of required height of the cutter bar from the ground; and
   the program of the control system also being a responsive to the second manually operable input for generating both said height input to said first and second adjustable links and said angle input to said angle adjustment member to automatically attain said set value of angle of the header relative to the ground about said axis.

2. The header assembly according to claim 1 wherein there is provided a height adjustment arrangement for adjusting the height of the header relative to the combine harvester and wherein the height of the header relative to the combine harvester is adjusted in association with the height of the first and second wheels.

3. The header assembly according to claim 1 wherein the arrangement for controlling the height of the header relative to the combine harvester automatically retains the header height so as to maintain part of the header at the feeder house at a required height to match the height at the gauge wheels.

4. The header assembly according to claim 3 wherein the header comprises a three part header with a center section and two wing sections where each of the wing sections is each flexibly coupled to the center section.

5. The header assembly according to claim 3 wherein the height of the header relative to the combine harvester is controlled by raising and lowering the feeder house.

6. The header assembly according to claim 1 wherein there is provided an adapter arranged to be mounted on the feeder house which supports the header on the feeder house including a crop transfer arrangement for carrying the crop material through the adapter to the feeder house.

7. The header assembly according to claim 1 wherein there is provided a floating suspension system for carrying the header on the feeder house.

8. The header assembly according to claim 7 wherein the floating suspension system is arranged such that a major part of the weight of the header is carried on the feeder house and a smaller part is carried on the gauge wheels.

9. The header assembly according to claim 7 wherein the floating suspension system is adjustable so as to set a required proportion of the weight of the header which is carried on the feeder house relative to a proportion of the weight of the header which is carried on the gauge wheels.

10. The header assembly according to claim 7 wherein the floating suspension system is arranged such that the proportion of the weight which is carried on the feeder house is of the order of 90%.

11. The header assembly according to claim 1 wherein the header frame includes a top main beam and a plurality of legs depending from the top main beam and wherein the gauge wheels are mounted behind the legs.

12. The header assembly according to claim 1 wherein the gauge wheels are mounted on the header frame such that, when adjusted to the required position, the gauge wheels are fixed relative to the header frame substantially without any suspension floating movement relative thereto.

13. The header assembly according to claim 1 wherein the first and second adjustable links each comprise a hydraulic cylinder.

14. The header assembly according to claim 1 wherein the driver interface comprises a touch screen mounted in a cab of the combine harvester.

15. The header assembly according to claim 1 wherein the driver interface is a separate control system independent of a control system for the combine harvester.

16. The header assembly according to claim 1 wherein the driver interface is integrated with a control system for the combine harvester.

17. The header assembly according to claim 1 wherein the driver interface includes a third input acting to set a value of a required speed of the crop transport device.

18. The header assembly according to claim 1 wherein the crop transport device includes a draper.

19. A combine harvester comprising:
   a harvesting machine for processing cut crop material;
   a feeder house of the harvesting machine for feeding the cut crop into an inlet of the harvesting machine; and
   a header assembly according to claim 1.

* * * * *